June 4, 1963

G. G. BUDWIG 3,091,795

GROMMET

Filed Aug. 5, 1960

INVENTOR.
GILBERT G. BUDWIG
BY Lyon & Lyon
ATTORNEYS

United States Patent Office 3,091,795
Patented June 4, 1963

3,091,795
GROMMET
Gilbert G. Budwig, 3400 Bayside Walk,
Mission Beach, Calif.
Filed Aug. 5, 1960, Ser. No. 47,748
5 Claims. (Cl. 16—2)

This invention relates to grommets, and included in the objects of this invention are:

First, to provide a grommet formed of two identical and complementary elements adapted to be pressed from opposite sides through an opening in a panel, the grommet, when installed, forming an insulating ring around and over the margins of the opening.

Second, to provide a grommet formed of identical complementary elements which incorporates novel interlocking means which insure mutual retention of the grommet elements when the elements are forced together, thereby providing a grommet which may be depended upon to remain in place after installation.

Third, to provide a grommet which, by reason of its construction from complementary elements interengageable from opposite sides of a panel, need not be formed of highly yieldable material in order to be installed.

Fourth, to provide a grommet, the complementary elements of which may be readily molded of various plastic materials by automatic injection molding machines, thereby to provide a grommet which is not only particularly economical of manufacture, but also has a much longer service life than conventional grommets formed of rubber or similar material.

Fifth, to provide a grommet which may be formed of plastic material which readily bonds to itself when wetted with a solvent so that, after installation, the complementary parts of the grommet may be permanently bonded together to prevent removal.

With the above and other objects in view as will appear hereinafter, reference is directed to the accompanying drawings, in which.

Figure 1:
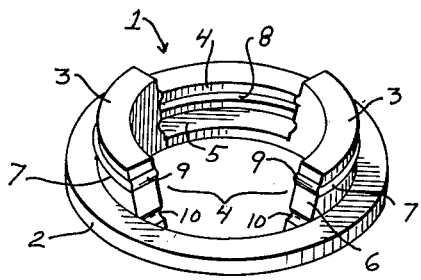
FIGURE 1 is a perspective view showing one form of one of the grommet elements.
Figure 2:
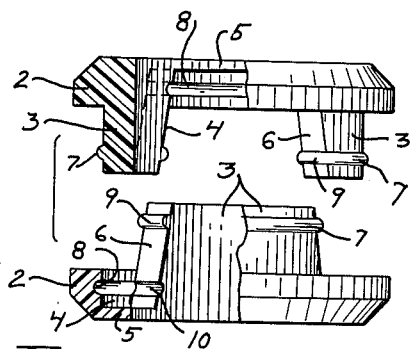
FIGURE 2 is a partially sectional, partially side elevational view showing a mating pair of grommet elements before being joined together.
Figure 3:
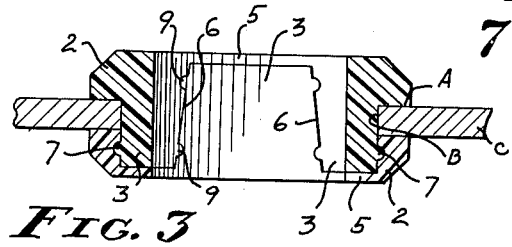
FIGURE 3 is a transverse sectional view of an assembled grommet shown in position and lining an opening in a panel.

Reference is first directed to FIGURES 1 through 3. In the construction herein illustrated the grommet consists of two identical grommet elements 1. Each grommet element includes a ring member 2 adapted to overlie the margin A of an opening B in a panel C or other structure. Extending axially from the ring element is a pair of arcuate tongues 3 which are adapted to project through and partially line the opening B. Each tongue 3 as shown in FIGURES 1 through 3 occupies approximately a quarter circle and the two tongues are diametrically disposed.

Between the two tongues each grommet element is provided with arcuate recesses 4 which preferably do not extend the full axial depth of the ring so that the base ends of the tongues 3 are connected by arcuate webs 5 closing the bottom or axial ends of the recesses 4.

The circumferential ends of the tongues 3 form circumferentially sloping ends 6, which also form the circumferential ends of the recesses 4. The arcuate spaces between the tongues are dimensionally equal to the tongues so that a pair of the grommet elements 1 may be joined together by inserting the tongues of one element axially into the spaces between the tongues of the mating grommet element until the tongues 3 are received into the recesses 4.

Near their axial extremities, the outer peripheries of the arcuate tongues 3 are provided with ribs 7. Mating grooves 8 are formed in the radially outer walls of the recesses 4. Thus, when the pair of grommet elements are forced together the ribs 7 and grooves 8 interlock to secure the grommet elements together.

Figure 6:
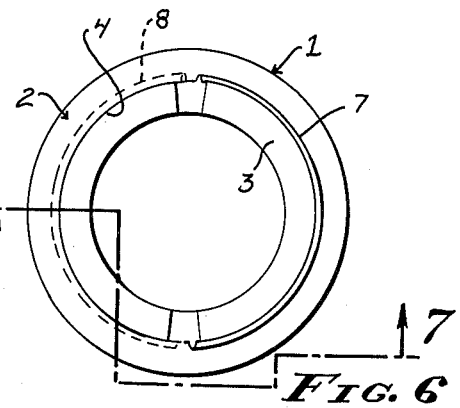
FIGURE 6 is an axial end view of a further modified grommet element.
Figure 7:
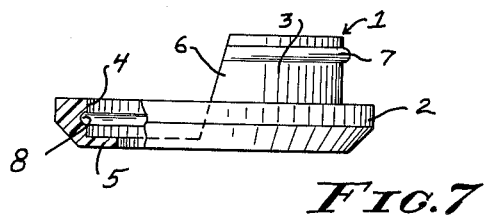
FIGURE 7 is a partially sectional, partially elevational view thereof taken through 7—7 of FIGURE 6.

Similarly, the sloping circumferential ends 6 of the tongues 3 are provided with ribs 9 and mating grooves 10 are provided at the circumferential ends of the recesses 4. Utilization of both the ribs 7 and 9 and their mating grooves 8 and 10 provide a maximum interlocking area between the two grommet elements; however, either the ribs 7 and their corresponding grooves 8 or the ribs 9 and their corresponding grooves 10 may be omitted, the latter arrangement being indicated in FIGURES 6 and 7.

Figure 4:
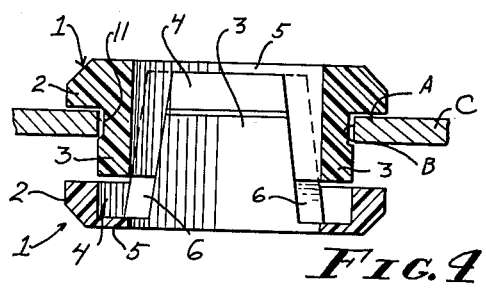
FIGURE 4 is a sectional view similar to FIGURE 3 showing a modified form of grommet with the grommet elements partially engaged.
Figure 5:
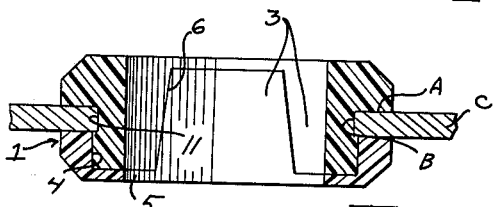
FIGURE 5 is a sectional view of the modified grommet shown in FIGURE 4 with the parts in their assembled or fully engaged position.

Still further, as indicated in FIGURES 4 and 5, both the ribs 7 and 9 and grooves 8 and 10 may be omitted. This is particularly true if the circumferential ends of the tongues 3 slope; for, by reason of these sloping ends, the ring members and their tongues tend to expand radially as the grommet elements are forced together. This radial expansion may be utilized as shown in FIGURES 4 and 5 by providing a shallow channel 11 around the outer surfaces of the tongues 3 adjacent the ring members 2. As illustrated in FIGURE 4 the tongues pass readily through the opening B, but upon axial interengagement of the grommet elements sufficient radial expansion takes place to insure an interlocking fit. In fact, even without provision of the channel 11 a snug and tight fit may be obtained.

As indicated in the drawings, the grommet elements are formed of plastic material, preferably a semiyieldable material capable of being molded with moderate undercut as required by the small channels or grooves and ribs illustrated. The material need not, however, be so yieldable as to permit insertion of the ring members 2 through the opening B as is required of a conventional one piece grommet. Still further, the plastic material may be so selected as to bond readily to itself by an adhesive or a solvent, so that the grommet elements may be permanently joined together by the application of suitable adhesive or solvent before or after installation.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A grommet adapted to extend through and cover the margins of an opening in a panel member, comprising:

a. a pair of identical and mating ring elements adapted to cover the margins of said opening at opposite sides of said panel member;

b. at least a pair of identical arcuate tongues extending from the inner margins of said ring elements and having an external diameter corresponding to the diameter of and partially lining said opening and extending through and beyond said opening;

c. at least a pair of identical arcuate recesses extending partially through the inner margins of said ring elements to receive and circumferentially enclose the tongue of the mating ring element, there being a web overlying each of said recesses whereby the exposed surfaces of each ring element are continuous and annular;

d. and means operable, on forcing said tongues and recesses into interengagement, to secure said ring elements together.

2. A grommet as set forth in claim 1, wherein said securing means includes:

a. rudimentary external flanges at the extremities of said tongues;

b. and tapered surfaces at the circumferential extremities of said tongues adapted, on interengagement of said ring elements, to spread the extremities of said tongues.

3. A grommet as set forth in claim 1, wherein:

a. on engagement of said ring elements, the extremities of said tongues and arcuate walls of said recesses form confronting portions;

b. and said securing means are mating ridges and grooves formed in said confronting portions.

4. A grommet element, comprising:

a. a flat ring member;

b. at least one arcuate tongue portion projecting axially from the radially inner margin of said ring member, said tongue having a greater arcuate extent at its base than at its extended end;

c. the remaining radially inner margin of said ring member forming at least one mating recessed portion;

d. an arcuate rib element formed on one of said portions;

e. an arcuate groove element formed in the other of said portions;

f. said tongue and recess portions and said rib and groove elements being relatively dimensioned for interlocking engagement with the mating parts of an identical grommet element.

5. A grommet as set forth in claim 4, wherein:

a. each of said ring elements includes a pair of tongues and a pair of recesses, each tongue and recess occupying approximately 90° of the circumference thereof.

References Cited in the file of this patent

UNITED STATES PATENTS

| | | |
|---|---|---|
| 2,171,726 | Howell | Sept. 5, 1939 |
| 2,501,674 | Graham | Mar. 28, 1950 |
| 2,559,759 | De Swart | July 10, 1951 |
| 2,797,605 | Metze et al. | July 2, 1957 |